J. B. SCHUMAN.
SHOCK HANDLING ATTACHMENT FOR CORN HUSKING AND SHREDDING MACHINES.
APPLICATION FILED MAY 27, 1907.

990,785.

Patented Apr. 25, 1911.

Witnesses
Frank A. Fahle
Thomas W. McMeans

Inventor
James B. Schuman
BY Bradford & Hood,
Attorneys

J. B. SCHUMAN.
SHOCK HANDLING ATTACHMENT FOR CORN HUSKING AND SHREDDING MACHINES.
APPLICATION FILED MAY 27, 1907.

990,785.

Patented Apr. 25, 1911.

J. B. SCHUMAN.
SHOCK HANDLING ATTACHMENT FOR CORN HUSKING AND SHREDDING MACHINES.
APPLICATION FILED MAY 27, 1907.

990,785.

Patented Apr. 25, 1911.

Witnesses
Frank A. Fahle
Thomas W. McMeans

Inventor
James B. Schuman
BY Bradford & Hood,
Attorneys

J. B. SCHUMAN.
SHOCK HANDLING ATTACHMENT FOR CORN HUSKING AND SHREDDING MACHINES.
APPLICATION FILED MAY 27, 1907.

990,785.

Patented Apr. 25, 1911.

Witnesses
Frank A. Fahle
Thomas W. McMeans

Inventor
James B. Schuman
BY
Bradford & Hood,
Attorneys

J. B. SCHUMAN.
SHOCK HANDLING ATTACHMENT FOR CORN HUSKING AND SHREDDING MACHINES.
APPLICATION FILED MAY 27, 1907.

990,785.

Patented Apr. 25, 1911.

J. B. SCHUMAN.
SHOCK HANDLING ATTACHMENT FOR CORN HUSKING AND SHREDDING MACHINES.
APPLICATION FILED MAY 27, 1907.

990,785.

Patented Apr. 25, 1911.

Witnesses
Frank A. Fahle
Thomas W. McMeans

Inventor
James B. Schuman
BY Bradford & Hood,
Attorneys

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHOCK-HANDLING ATTACHMENT FOR CORN HUSKING AND SHREDDING MACHINES.

990,785.

Specification of Letters Patent.

Patented Apr. 25, 1911.

Application filed May 27, 1907. Serial No. 375,965.

*To all whom it may concern:*

Be it known that I, JAMES B. SCHUMAN, a citizen of the United States, residing at Indianapolis, in the county of Marion and State of Indiana, have invented certain new and useful Improvements in Shock-Handling Attachments for Corn Husking and Shredding Machines, of which the following is a specification.

The most modern method of treating corn as it comes from the field, is by means of a machine known as a corn husker and shredder, into which the corn stalks are introduced and by means of which the ears of corn are severed therefrom and the husks and stalks "shredded" or reduced to a condition for fodder. The season within which this work may be properly done is very short as a rule and consequently such work needs to be done as expeditiously as possible. Corn, as is well known, when first cut, is gathered into shocks, and these shocks are permitted to stand and "weather" until the corn has undergone what may be called a post-ripening process, and has reached a condition suitable for the husking and shredding operation. These corn shocks are heavy and cumbersome, and extremely difficult to handle. During the season in which they are to be treated there is frequently freezing weather, and they sometimes freeze to the ground. The method of delivering such material to the husking and shredding machinery has usually heretofore been to cut the shocks apart, and, after transporting the stalks to the vicinity of the husking and shredding or crop treating machine, deliver them, a few at a time, to the feeding table of such machine. This has not only involved heavy and disagreeable manual labor, but the work has necessarily been quite slow, and it has been difficult by such means to supply the material to the husking and shredding machine rapidly enough to occupy it to its capacity.

It is the object of my invention to provide, in connection with corn husking and shredding machinery, a hoisting and handling apparatus by means of which the corn shocks may be lifted bodily to above the level of the feeding platform of the machine, by power, then swung over said platform, and deposited thereon, preferably in an upright position, so that an operative standing on said platform can conveniently and easily feed the same into the machine as rapidly as may be desired.

My said invention, therefore, consists of an apparatus for this purpose, which will first be fully described and the novel features therein then pointed out in claims.

Referring to the drawings, which are made a part hereof, and on which similar reference character indicate similar parts, Fig. 8 a view also similar to a portion of Fig. 3 but on an enlarged scale; Fig. 9 a detail sectional view showing a tubular brace rod (the middle portion thereof being broken away) at the point indicated by the dotted line 9—9 in Figs. 8 and 9; Fig. 10 a view looking in the direction indicated by the arrows from the dotted line 10—10 alongside of Fig. 9, and Fig. 11 a detail view as seen when looking in the direction indicated by the arrows from the dotted line 11—11 in Fig. 8.

The corn husking and shredding machine shown in the drawings, as will be readily understood, is merely for purposes of illustration: as any stalk crop-treating machine, with which this apparatus might be used, would be equally suitable for the purposes in question as a corn husking and shredding machine. Such machine will therefore not be further described herein except incidentally in describing the invention. It is provided with a suitable platform 21 upon which to deposit the shocks when lifted, and at the rear of this platform there should be, and preferably is, a guard wall 22. In front of the platform 21 (see especially Fig. 3) is the ordinary machine carrier or feeder 23.

The main uprights or masts 31 of my improved shock-handling apparatus are mounted upon the platform 21 preferably near the edge thereof nearest the feeder of the machine. For convenience in folding the apparatus, for storage, transportation and the like (as will be presently more fully described) I prefer to mount these masts on feet 32 by means of pivots 33.

Figure 3:
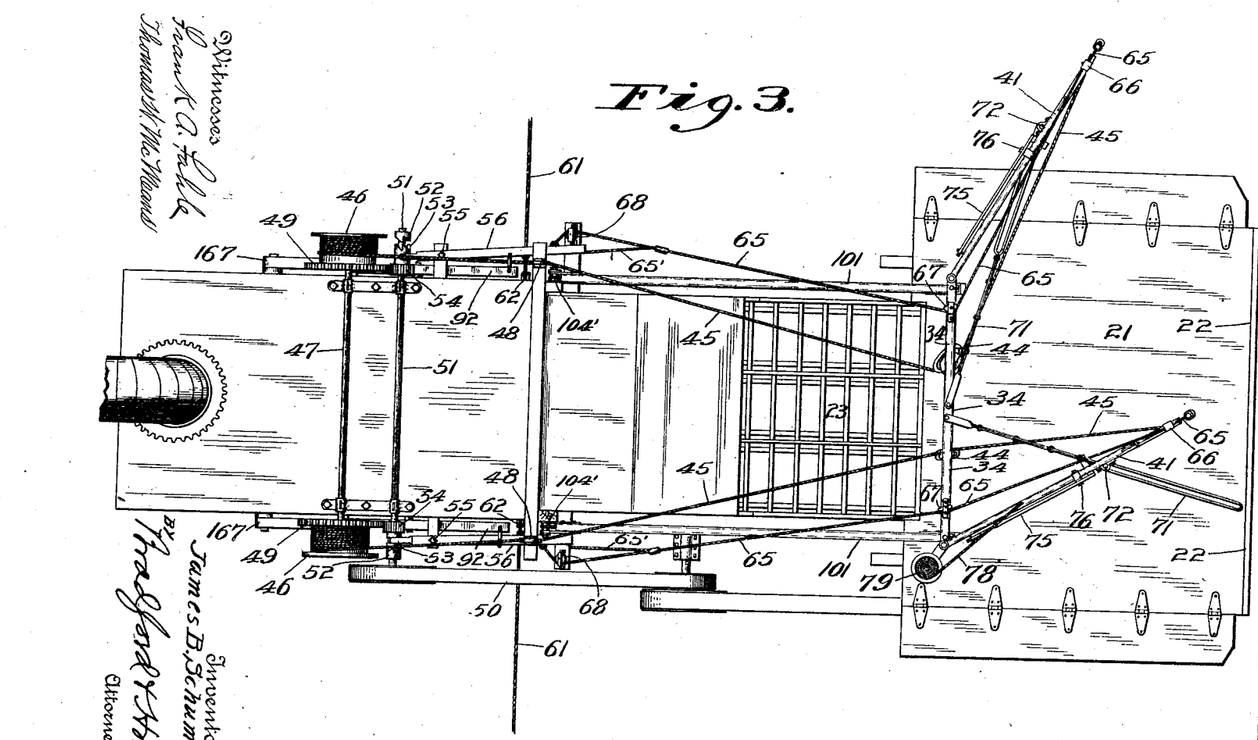
Fig. 3 a top or plan view of a corn husking and shredding machine having my improved shock-handling apparatus mounted thereon, the boom of the hoisting derrick on one side being swung outwardly to the position it occupies when lifting a shock, and the corresponding hoisting boom on the other side being swung inwardly as when depositing the lifted shock on the platform of the machine.
Figure 4:
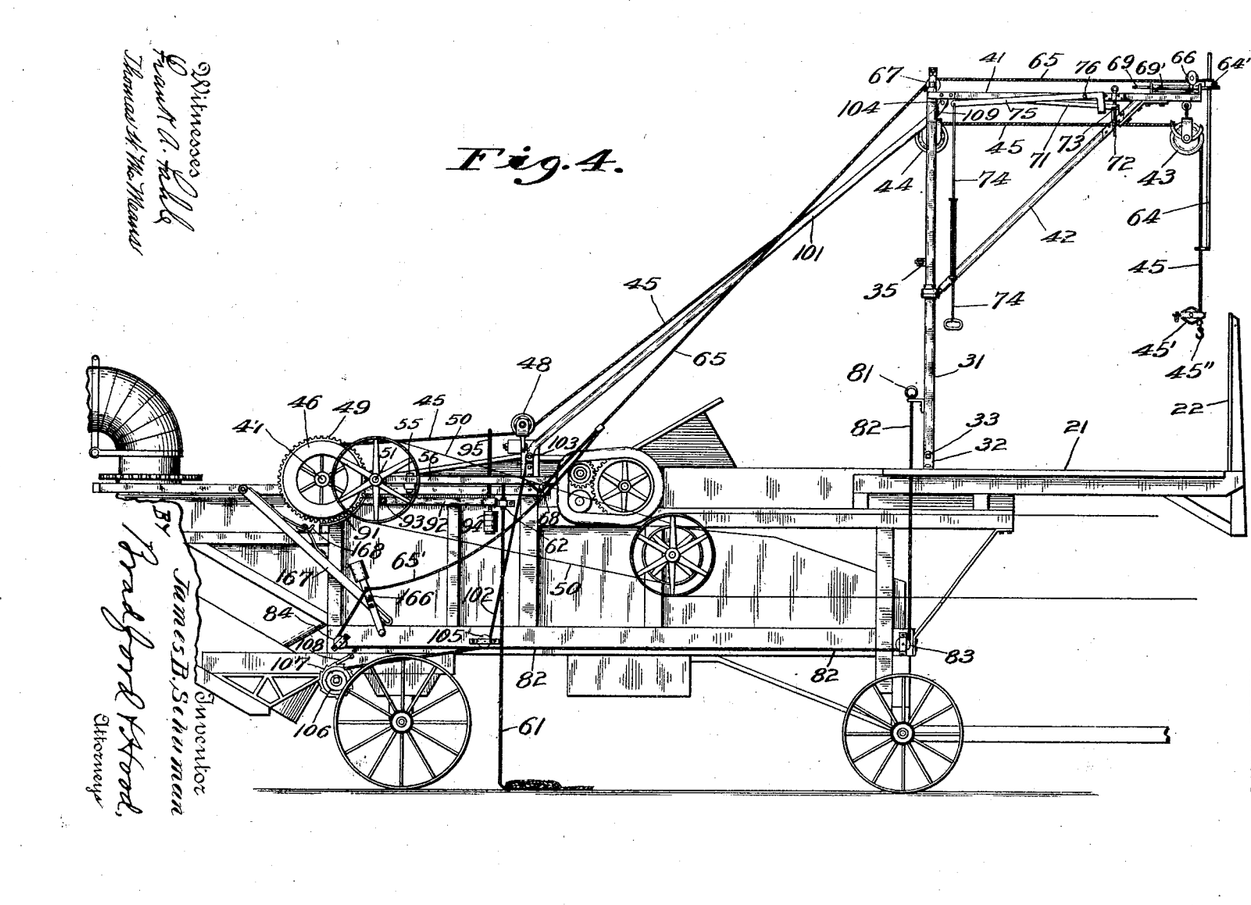
Fig. 4 a side elevation of the corn husking and shredding machine equipped with my said improved shock-handling attachment.

Pivotally mounted upon the masts 31 are the booms composed of horizontal members 41 and brace members 42, and which are capable of swinging to either of the two positions shown in Fig. 3, or to any intermediate position. Suspended on the outer end of each of these booms is a sheave 43, and a corresponding sheave 44 is carried by the cross-bar 34 connecting the upper ends of the two masts 31. Over these two sheaves the main hoisting cable 45 runs back to the corresponding main winding drum 46 which is mounted on the machine to which my apparatus is attached, at a suitable point to receive power therefrom, as will be presently described. As there are two booms—i. e., as my apparatus embodies practically a duplication of parts, in order that shocks may conveniently be handled on either or both sides of the machine—there are two of these winding drums, and these may conveniently be mounted on a single shaft 47. The cables 45, on their way to the drums 46, should pass under guiding sheave 48 supported on the main frame, as best shown in Fig. 4. As the two winding drums are to be operated independently of each other, they are of course loosely mounted on the shaft 47. The winding drums 46 are arranged to be driven by a power shaft 51; which, in turn, is driven by belt 50 from any suitable shaft of the corn husking and shredding machine or other machine with which my invention is used. Rigidly mounted upon each end of this shaft 51 is a clutch member 52. Loosely mounted on each end thereof is also a clutch member 53. The clutch members 53 are operatively connected to pinions 54. These pinions are in mesh with spur gear wheels 49 on the drums 46. Therefore, when one of the clutch members 53 is thrown into engagement with the corresponding clutch member 52, the corresponding drum 46 will be put in motion, as the shaft 51 revolves continuously during the operation of the machine. The clutch members 53 are operated by suitable levers 56 which are mounted by means of pivots 55 on suitable brackets on the machine.

Figure 1:
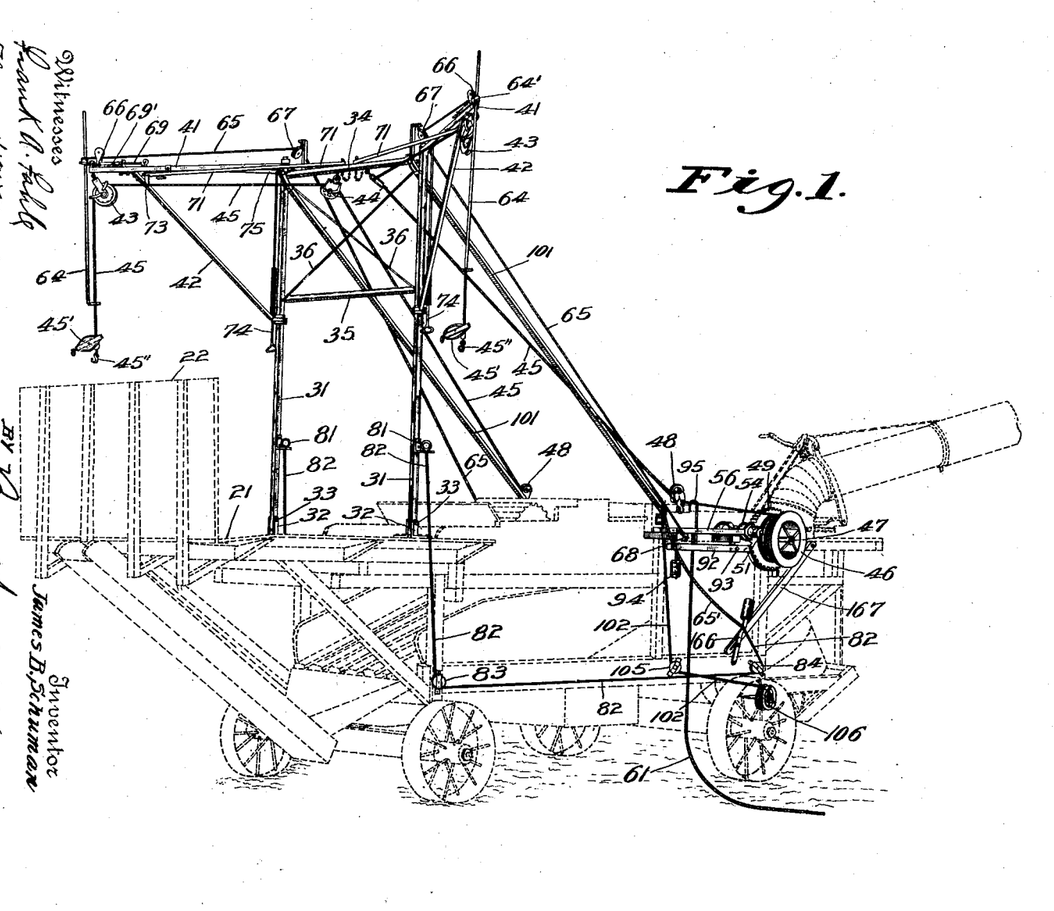
Figure 1 is a perspective view of my shock-handling apparatus as it appears in place upon a corn-husker and shredder—the corn husking and shredding machine itself being shown by means of dotted lines.
Figure 2:
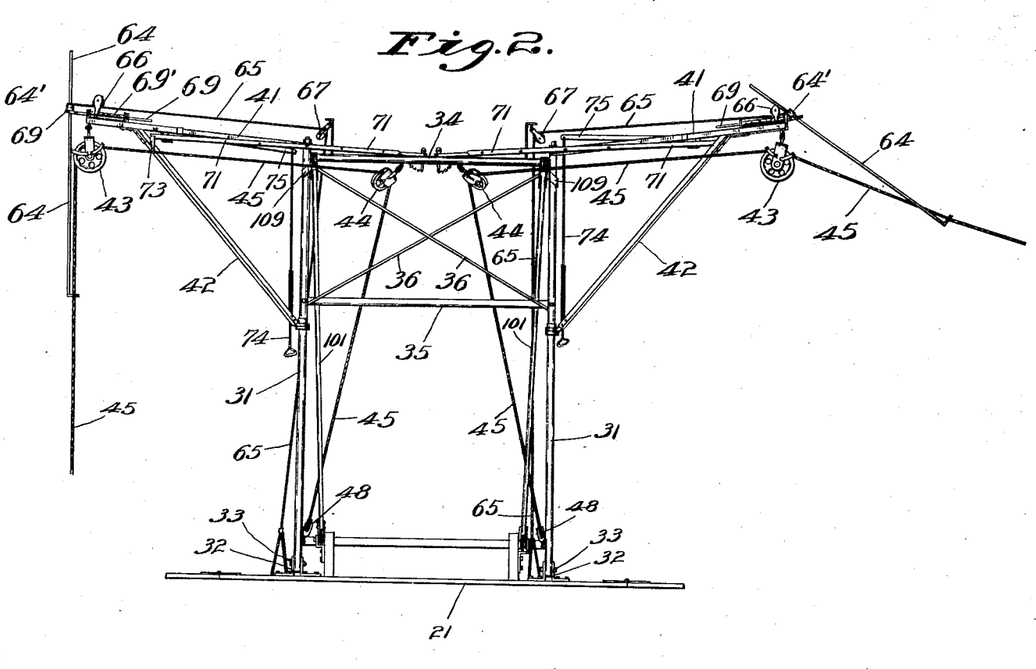
Fig. 2 a perspective rear view (approximately a rear elevation) of the said apparatus, the two hoisting cables being shown in different positions.
Figure 6:
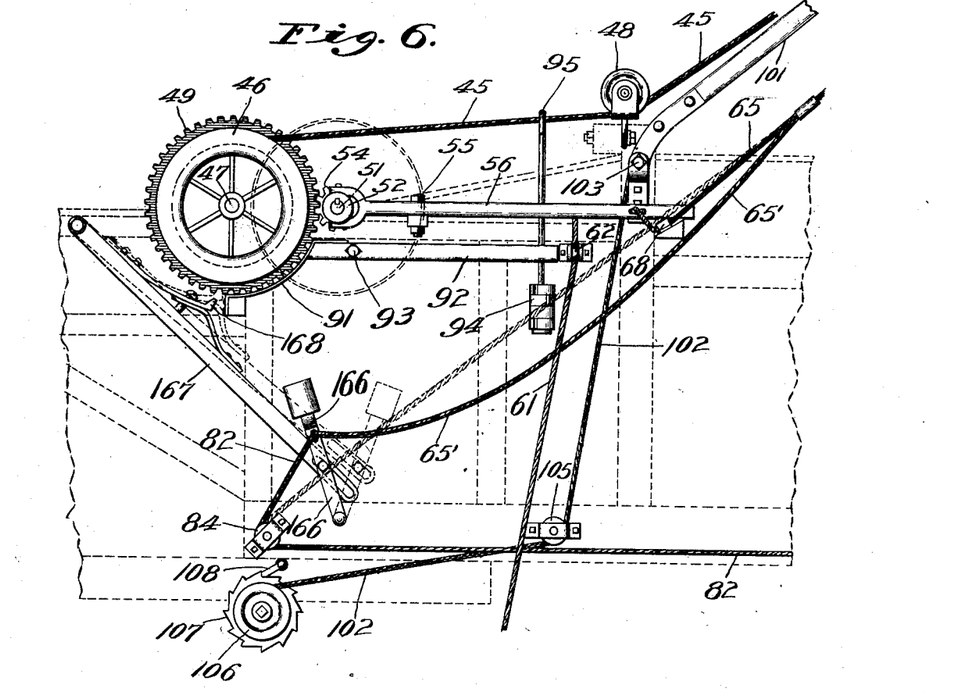
Fig. 6 a view similar to a portion of Fig. 4 but on an enlarged scale.
Figure 7:
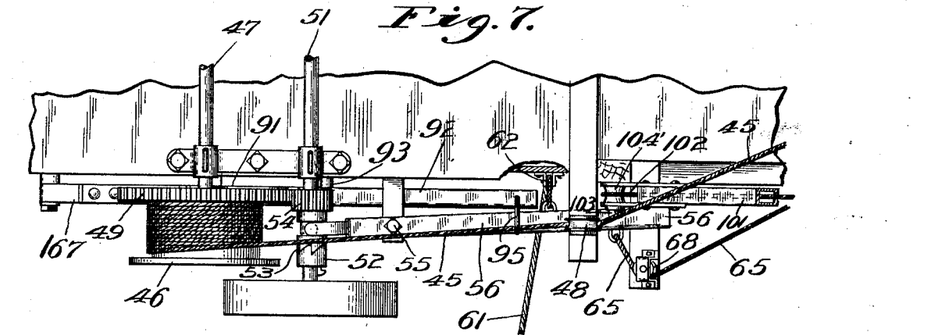
Fig. 7 a view similar to a portion of Fig. 3 but on an enlarged scale.
Figures 8, 9, 10, 11:
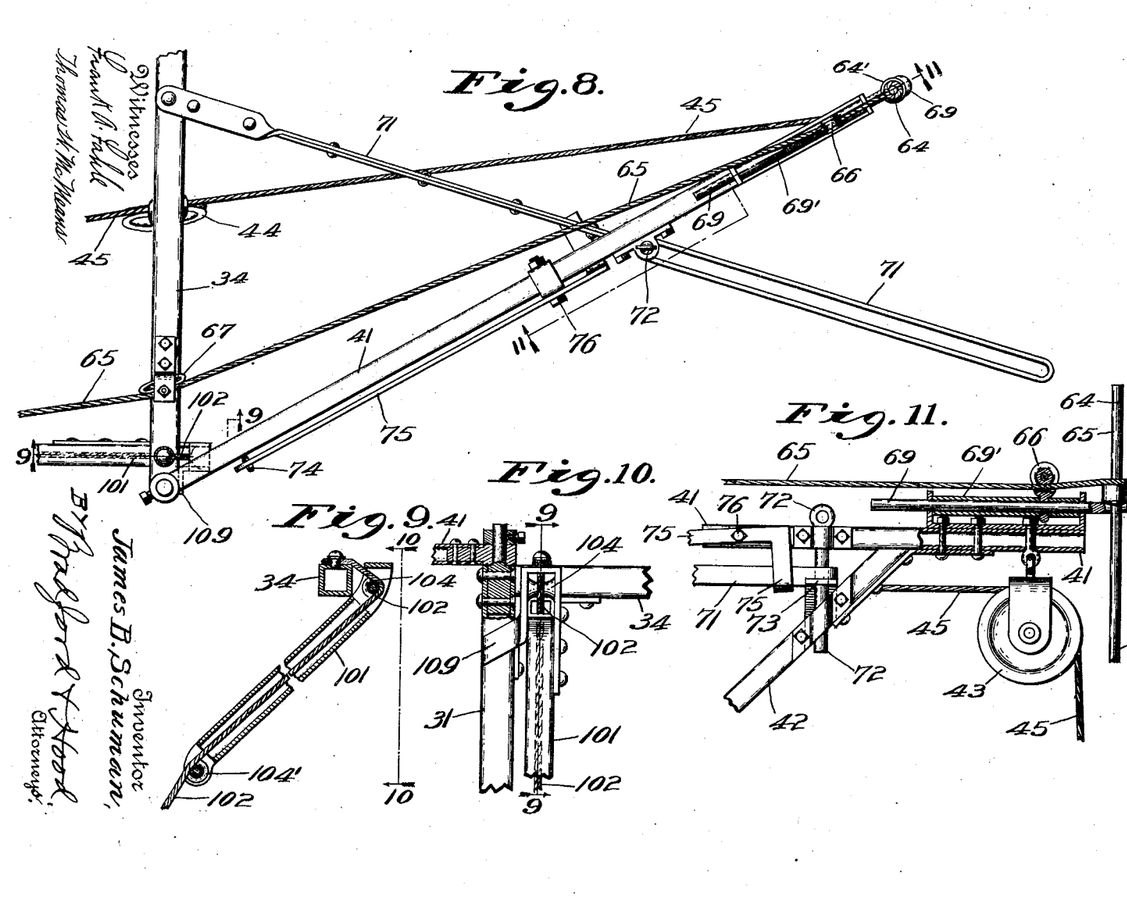

In operation, the cable 45 is unwound from the drum 46 and its lower end bearing suitable attaching devices (as pulling block 45′ and hook 45″) is carried out to the position where the shock to be lifted is located and attached to said shock as by encircling its waist. The driving gear of the winding drum is then thrown into action usually by pulling on the rope 61 attached to lever 56, which rope, as best shown in Fig. 3, is attached to the inner side of lever 56 and passes thence into the side of machine and over sheave 62 mounted in a suitable housing on said machine, while its free end may be carried to any point desired, and is usually carried by the operative who performs the work of attaching the shock to cable 45 with him to where the shock is situated. He is then able, as soon as he has attached the shock, to set the winding apparatus in operation by simply pulling upon the rope 61, as stated, and thus throwing the clutch member 53 into engagement with the clutch member 52, as before explained. When the shock has been drawn in and raised to a point above the platform 21 it comes in contact with the lower end of rod 64 which is carried in a suitable bearing (presently to be described) on the outer end of the boom 41. This has the effect to raise a rope 65 which is attached to said rod thus pulling said rope endwise over sheaves 66, 67 and 68, swinging the clutch-operating lever 56 in the opposite direction from that in which it has been moved by rope 61, and throwing the clutch member 53 out of engagement with the clutch member 52, thus automatically checking the operation of the lifting apparatus at just the right point. At the same time another branch 65′ of rope 65 pulls upon and throws over the weighted arm 166 from the position shown in full lines to the position shown in dotted lines in Fig. 6; and this, being in engagement with the dog-lever 167 throws the dog 168 into engagement with the spur gear 49, thus firmly and effectually locking said gear and the drum to which it is attached against further rotation, and holding the shock carried by cable 45 suspended in the position to which it has been elevated until it is desired to deposit it on the platform 21. The rod 64 is mounted in a bearing consisting of a rod 69 having an elongated eye-opening through which said rod 64 passes, and which is itself slidably mounted in the tubular bearing 69′ carried by boom 41. Said tubular bearing 69′ also serves as a means of attaching the housing of sheave 66. The vertical position of rod 64 is adjustable, as it is supported in the eye of bar or rod 69 by means of a collar 64′, which can be secured to any desired position thereon, as by setscrew s. So far during the operation of this apparatus the boom has been in its outermost position with its outer end beyond the boundaries of the platform 21, as is shown at the upper side of Fig. 3, and also at both sides of Figs. 1 and 2. It is held in this position until the lifting operation has been completed by a suitable brace bar 71, the inner end of which is pivoted to the cross-bar 34 and the outer end of which is slotted and embraces a pin 72 on the boom 41. As shown in Fig. 4, and also more plainly, in detail, in Fig. 11, this brace rod 71 has a lip 71' at its end which engages with a lug 73 alongside the pin 72 which locks the boom to its outer position until released. When the shock has been lifted to its highest position, and it is desired to swing it in over and onto the platform, the operative pulls upon handle 74 connected to lever 75 which is pivoted at 76 and has an end projecting under brace-rod 71, and thus lifts said brace-rod out of contact with the projection 73, leading the boom (by reason of the slotted condition of said brace-rod) free to swing inwardly from its outermost to its innermost position. As the sheave 44 is so hung and positioned as to occasion a pulling force on the cable 45 of such a character as to tend to swing the boom inwardly, as soon as this engagement is released, the boom will automatically swing to its innermost position. When it has reached this position, the operative pulls on the handle 81 of rope 82 which rope runs over sheaves 83 and 84, and this throws the weighted lever 166 from the position shown in dotted lines to the position shown in full lines, thus disengaging the locking pawl 168, and permitting the drum to rotate in the reverse direction, thus allowing the cable 45 to unwind and the shock to descend and be deposited on the platform 21. I also provide a means for automatically swinging the boom outwardly when the pull on the cable 45 is released. This means I have shown as consisting of a spring-actuated drum 79 (shown as containing an ordinary clock spring) from which a rope 78 leads and is attached at its outer end to said boom 41. These devices will obviously swing the boom to its outermost position and there hold it, except when it is swung inwardly by a superior force. This device is illustrated only in Fig. 3, and only in connection with one of the booms in said figure—the other being omitted to avoid complication of the drawing at that point.

It is desirable to prevent too rapid rotation of the drum in unwinding, and consequently I provide a friction brake 91 which bears against the outer ends of the teeth of the spur gear 49. This brake is operated by a lever 92 mounted on pivot 93, and is held into engagement with the desired force by means of weight 94. A hooked rod 95 is also connected to the lever 92 and extends up and passes over cable 45. As the cable slackens, when the locking pawl 168 is released, the cable 45 will sag, and the lever 92 be thus permitted to descend, applying the brake 91 with suitable force. When, however, the cable 45 is drawn tight, as when a shock is being lifted, this rod 95 will pull on lever 92 upwardly sufficiently to relieve the brake-pressure, so that said brake is only effective during the slack condition of cable 45. The amount of brake-pressure can of course be regulated, as desired, by increasing or diminishing the weight 94, or by adjusting the length of the hooked rod 95.

Figure 5:
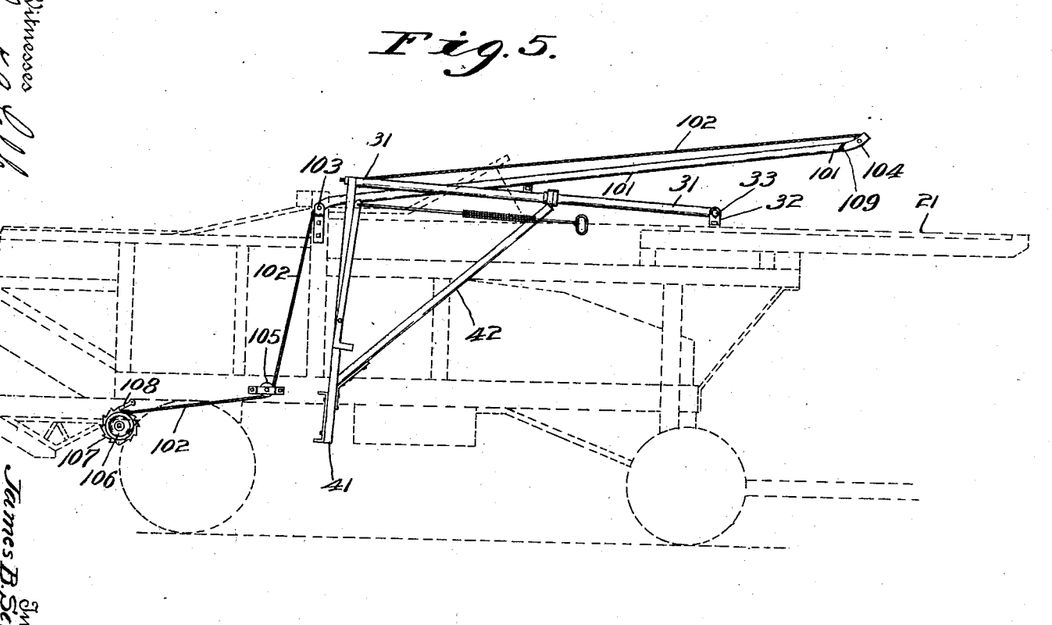
Fig. 5 a view similar to Fig. 4 except that the shock-handling apparatus is shown in its folded position ready for storage or transportation.

This apparatus is designed to be folded down into compact position, for purposes of transportation, storage, and the like. This is illustrated in Fig. 5. The change in position is effectuated by means of the brace rods 101 and hoisting ropes or cables 102. The brace rods 101 are preferably tubular, and are mounted on the machine with which this apparatus is to operate by means of pivots 103 and carry at their upper ends sheaves 104. The ropes 102 are attached at the outer ends of masts 31 and pass thence over the sheaves 104 down through the tubular brace rods 101 to sheaves 104', thence to sheaves 105 carried in suitable housings on frame work, and thence to winding drums 106, which may be actuated by a suitable crank. Said winding drums are provided with ratchet rims 107 with which pawls 108 are adapted to engage. When it is desired to raise the apparatus from the folded condition shown in Fig. 5 to the operative position shown in Fig. 4 and other figures, a crank is applied to the shaft of the winding drum 106, and the ropes 102 will draw the masts 31 to their upright position, as shown in said figures. When they reach the upright position they come in contact with ears 109 on the brace bars 101, which stops any further movement in that direction. The masts are thus held firmly from moving either forward or back by these brace-bars and ropes. Sidewise movement is of course prevented by the construction itself—the cross bar 34 already described being supplemented by similar or lower-positioned cross bar 35 (see especially Figs. 1 and 2) and crossed brace rods 36. When fully elevated, the parts are rigidly held by means of the ratchet 107 and pawl 108. When it is desired to fold up this apparatus —i. e., move it from the condition shown in Fig. 4 to the condition shown in Fig. 5—the ratchet and pawl are disengaged, and the rope 102 permitted to unwind from the drum 106.

The operation of this machine may be briefly recapitulated as follows: One of the operatives, after the lifting cable is let down, will carry the free end of said cable to a corn shock, which has previously been placed in the vicinity of the machine, and attaches said cable to such shock. Thereupon the winding mechanism is set in operation, and the shock thereby lifted to the required height. The latch or stop holding the boom in its outer position is then disengaged, and the boom will swing, under the pull of the cable, and actuated by the weight of the shock, to a position above the feeding table of the machine. The pawl being then disengaged, the cable will unwind from the winding drum sufficiently to permit the shock to descend on to the table, which it is thus enabled to reach in its original condition, and from which position the operative, having cut the band of the shock, may feed it, at will, into the machine. The boom is then swung to its outer position, the cable run out and the operation repeated. It will thus be seen that every shock is lifted as a unit from the position where it has been placed to the feeding table of the machine. All manual labor except so much as is needed to make the attachments and manipulate the mechanism is thus wholly avoided. The husking and shredding machine can be supplied as rapidly as desired up to its capacity, and the work thus performed not only with much less manual labor than heretofore, but also much more speedily.

Having thus fully described my said invention, what I claim as new and desire to secure by Letters Patent, is:

1. A shock handling mechanism comprising a folding frame carrying derricks from which shocks are immediately suspended in lifting operation, braces mounted on the upper portion of said folding frame and extending downwardly to a suitable support, cables for supporting said foldable frame in raising and lowering the same, and means for locking said cables when the frame is in its elevated position, whereby the apparatus may be folded and unfolded when desired.

2. A shock handling mechanism comprising a folding frame, adjustable brace bars associated with said frame, a winding drum, a rope running from said winding drum and communicating with said folding frame, and means for actuating said winding drum.

3. The combination, in a shock handling mechanism, of a folding frame mounted on pivots at its lower end, adjustable brace bars associated with said frame and carrying sheaves, a winding drum, a rope running from said winding drum over said sheaves and brace bars to the top of said frame, and means for actuating said winding drum.

4. The combination, in a shock handling mechanism, of a pivotally mounted folding frame, adjustable brace bars associated therewith and carrying sheaves, a winding drum, a rope running from said winding drum over said sheaves to the top of said folding frame, and means for actuating said winding drum.

5. The combination, in a shock handling mechanism, of a folding frame mounted on pivots at its lower end, brace bars pivotally mounted at their lower ends and carrying sheaves, a winding drum, a rope running from said winding drum over said sheaves through said brace bars to the top of said folding frame, and means for actuating said drum.

6. In shock handling mechanism, means for drawing material to a platform and elevating it to a position higher than the platform, automatic means for sustaining the elevating means and the material carried thereby in that position, means for simultaneously moving the material over and lowering it upon the platform, and means for returning the elevating means to its operative position.

7. In shock handling mechanism, a derrick embodying a boom arranged to deposit a corn shock on a platform, a cable carried by said boom and adapted to lead to a distant point, means for attaching said cable to a corn shock, means for drawing in said cable, means for actuating said cable-drawing means embodying a connection leading also to the distant point where the shock is situated, whereby the same operative is enabled to both connect the cable to the shock and actuate the mechanism for drawing in said shock.

8. In shock handling mechanism, a derrick embodying a boom arranged to deposit a shock on a platform, a cable carried by said boom and adapted to lead to a distant point, means for attaching said cable to a corn shock, means for drawing in said cable, means for actuating said cable-drawing means embodying a connection leading also to the distant point where the shock is situated whereby the same operative is enabled to both connect the cable to the shock and actuate the mechanism for drawing in the shock, and means leading to the cable-drawing mechanism whereby an operative on the platform may release the same.

9. Shock handling mechanism comprising a receiving platform, a pair of lifting mechanisms supported above said platform and each movable outwardly from the medial plane thereof, whereby a shock may be delivered by said mechanisms to the platform from both sides of the same, and a substantially vertical shock support arranged in conjunction with the receiving platform.

10. Shock handling mechanism comprising a receiving platform, a pair of independent lifting mechanisms supported above said platform and each movable outwardly from the medial plane thereof, whereby a shock may be delivered by said mechanisms to the platform from both sides of the same, and a substantially vertical shock support arranged in conjunction with the receiving platform.

11. Shock handling mechanism comprising a receiving platform, a pair of supports, a lifting cable mounted on each support above the receiving platform, means for horizontally swinging each of said supports to opposite sides of the platform, winding mechanism for said lifting cables, and means for controlling the movement of said cables.

12. Shock handling mechanism comprising a receiving platform, a pair of supports, a lifting cable mounted on each support above the platform, means for horizontally swinging each of said supports to opposite sides of the platform, winding mechanism of said lifting cables, means for controlling the movements of said cables, and a substantially vertical shock support arranged to coöperate with the receiving platform.

13. Shock handling mechanism comprising a receiving platform, a pair of supports, a lifting cable mounted on each support above the platform, means for horizontally swinging each of said supports independently to opposite sides of said platform, independent winding mechanism for said lifting cables, and a substantially vertical shock support arranged to coöperate with said receiving platform.

14. Shock handling mechanism comprising a receiving platform, a pair of lifting mechanisms supported above said platform and each movable outwardly from the medial plane thereof whereby a shock may be delivered by said mechanisms to said platform from both its sides, a substantially vertical shock support arranged to coöperate with said platform, and means operable from the field for controlling the action of said lifting mechanisms.

15. Shock handling mechanism comprising a receiving platform, a pair of independent lifting mechanisms supported above said platform and each movable outwardly from the medial plane thereof whereby a shock may be delivered by said mechanisms to the platform from both its sides, a substantially vertical shock support arranged to coöperate with said receiving platform, and means operable from the field for independently controlling the action of said lifting mechanisms.

16. Shock handling mechanism comprising a receiving platform, a pair of supports, a lifting cable mounted on each support above said platform, means for horizontally swinging each of said supports to opposite sides of said platform, winding mechanism for said lifting cables, a substantially vertical shock support arranged to coöperate with said platform, and means operable from the field for controlling the action of said winding mechanism.

17. Shock handling mechanism comprising a receiving platform, a pair of supports, mounted above said platform and each independently movable horizontally to one side thereof, a lifting cable mounted on each of said supports, means for horizontally swinging each of said supports to opposite sides of said platform, independent winding mechanism for said lifting cables, a substantially vertical shock support arranged to coöperate with said platform, and means operable from the field for independently controlling the action of said winding mechanism.

18. Shock handling mechanism comprising a receiving platform, a framework embodying a pair of booms arranged to swing over the platform from opposite sides thereof, a pair of lifting mechanisms each consisting in part of a cable passing through a support on each of said booms near its outer end and through a support on the frame eccentric to the axis of the boom whereby a pull upon said cable will tend to swing the boom to bring its outer end over said platform, releasable means for holding the boom against such rotation, and a substantially vertical shock support arranged in conjunction with said platform.

19. Shock handling mechanism comprising a receiving platform, a lifting cable support arranged above said platform, a lifting cable passing through said support and provided at its outer end with means for engaging a shock, winding mechanism for said cable, and means operating in conjunction with the lifting cable independently of the winding mechanism for lowering the elevated shock upon said platform, and a substantially vertical shock support arranged to coöperate with said platform.

20. Shock handling mechanism comprising a receiving platform, a lifting-cable support arranged above said platform and movable laterally toward and from a point thereover, a lifting cable passing through said support and provided at its outer end with means for engaging a shock, winding mechanism for said cable, means operating in conjunction with the lifting cable for lowering the elevated shock in standing position upon said platform, and a substantially vertical shock support arranged to coöperate with the receiving platform.

21. Shock handling mechanism comprising a receiving platform, a lifting cable support arranged above and adjacent said platform and movable laterally toward and from a point thereover, a lifting cable passing through said support and provided at its outer end with means for engaging a shock, winding mechanism for said cable, means for sustaining a lifted shock above the plane of said platform, means operating in conjunction with the lifting cable independently of the winding mechanism for lowering the lifted shock in standing position upon said platform, and a substantially vertical shock support arranged to coöperate with said platform.

22. The combination with a crop-treating machine, of a feeding platform arranged in manual feeding relation to the receiving end of said machine and adapted to support a mass of stalks in substantially upright position, a shock-supporting member arranged above said platform, means carried by said member for engaging and maintaining a shock of stalks in substantially upright position, lifting mechanism for lifting said shock-engaging means, means controlled by the upward movement of the shock for automatically discontinuing the action of the lifting means when the shock has reached a point above the platform.

23. The combination with a crop-treating machine, of a feeding platform arranged in manual feeding relation to the receiving end of said machine and adapted to support a mass of stalks in substantially upright position, a shock-supporting member arranged above said platform, means carried by said member for engaging and maintaining a shock of stalks in substantially upright position, lifting mechanism for lifting said shock-engaging means, means controlled by the upward movement of the shock for automatically discontinuing the action of the lifting means when the shock has reached a point above the platform, means for normally retaining the shock-supporting member in position to maintain the elevated shock above but to one side of the platform, means for withdrawing said retaining means, means by which the shock-supporting member, when released, will be moved to a point to bring the elevated shock above the platform.

24. The combination with a crop-treating machine, of a feeding platform arranged in manual feeding relation to the receiving end of said machine and adapted to support a mass of stalks in substantially upright position, a shock-supporting member arranged above said platform, means carried by said member for engaging and maintaining a shock of stalks in substantially upright position, lifting mechanism for lifting said shock-engaging means, means controlled by the upward movement of the shock for automatically discontinuing the action of the lifting means when the shock has reached a point above the platform, and means extended to a point distant from the mechanism by which the lifting mechanism may be set into operation.

25. The combination with a crop-treating machine, of a feeding platform arranged in manual feeding relation to the receiving end of said machine and adapted to support a mass of stalks in substantially upright position, a shock-supporting member arranged above said platform, means carried by said member for engaging and maintaining a shock of stalks in substantially upright position, lifting mechanism for lifting said shock-engaging means, means controlled by the upward movement of the shock for automatically discontinuing the action of the lifting means when the shock has reached a point above the platform, means for normally retaining the shock-supporting member in position above but to one side of the platform, means for withdrawing said retaining means, means by which the shock-supporting member, when released, will be moved to a point to bring the elevated shock above the platform, and means extended to a point distant from the mechanism by which the lifting mechanism may be set into operation.

In witness whereof, I, have hereunto set my hand and seal at Indianapolis, Indiana, this twenty-fourth day of May, A. D. one thousand nine hundred and seven.

JAMES B. SCHUMAN. [L. S.]

Witnesses:
CHESTER BRADFORD,
THOMAS W. MCMEANS.

---

Copies of this patent may be obtained for five cents each, by addressing the "Commissioner of Patents, Washington, D. C."